(12) United States Patent
Kato et al.

(10) Patent No.: US 11,150,124 B2
(45) Date of Patent: Oct. 19, 2021

(54) LIQUID LEVEL DETECTION DEVICE UNIT

(71) Applicant: YAZAKI CORPORATION, Tokyo (JP)

(72) Inventors: Shinpei Kato, Makinohara (JP); Shintaro Nakajima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 114 days.

(21) Appl. No.: 16/736,944

(22) Filed: Jan. 8, 2020

(65) Prior Publication Data
US 2020/0256719 A1 Aug. 13, 2020

(30) Foreign Application Priority Data

Feb. 12, 2019 (JP) .............................. JP2019-022700

(51) Int. Cl.
*G01F 23/38* (2006.01)
(52) U.S. Cl.
CPC .................................... *G01F 23/38* (2013.01)
(58) Field of Classification Search
CPC ...................................................... G01F 23/38
See application file for complete search history.

(56) References Cited

U.S. PATENT DOCUMENTS

| | | | |
|---|---|---|---|
| 9,435,678 B2 * | 9/2016 | Koide | ................... G01F 23/363 |
| 9,677,926 B2 * | 6/2017 | Terada | ................... G01F 23/32 |
| 10,371,560 B2 * | 8/2019 | Miyagawa | ............ G01F 23/363 |
| 2014/0020464 A1 * | 1/2014 | Farmanyan | ............. G01F 23/38 73/313 |
| 2015/0185066 A1 * | 7/2015 | Koide | ..................... G01F 23/36 73/317 |
| 2015/0362356 A1 * | 12/2015 | Fukuhara | ................ G01F 23/38 73/314 |
| 2016/0047686 A1 * | 2/2016 | Terada | .................... G01F 23/38 73/317 |
| 2016/0327424 A1 * | 11/2016 | Miyagawa | ............ G01F 23/363 |
| 2019/0360852 A1 | 11/2019 | Ichisawa | |

FOREIGN PATENT DOCUMENTS

| | | |
|---|---|---|
| JP | 61-167528 U | 10/1986 |
| JP | 2013-178141 A | 9/2013 |
| JP | 2014163880 A | 9/2014 |
| WO | 2018/139257 A1 | 8/2018 |

* cited by examiner

*Primary Examiner* — John Fitzgerald
(74) *Attorney, Agent, or Firm* — Sughrue Mion, PLLC

(57) ABSTRACT

A liquid level detection device unit includes a liquid level detection device configured to detect a liquid level of liquid stored in a tank, and a fixing member fixing the liquid level detection device to inside of the tank. The liquid level detection device includes a device body, at least one terminal electrically connected to a detection unit in a housing of the device body, and a detection wire in which one end is electrically connected to an exposed part of the terminal exposed from the housing. At least one through opening is provided on an attachment surface of the fixing member so as to face the exposed part of the terminal and prevent the liquid from staying in a connection portion between the terminal and the detection wire.

5 Claims, 7 Drawing Sheets

LIQUID LEVEL DETECTION DEVICE UNIT

CROSS REFERENCE TO RELATED APPLICATIONS

This application claims priority from Japanese Patent Application No. 2019-022700 filed on. Feb. 12, 2019, the entire contents of which are incorporated herein by reference.

BACKGROUND OF THE INVENTION

Field of the Invention

The present invention relates to a liquid level detection device unit.

Description of Related Art

As a device for detecting height of a liquid level of liquid stored in a container (tank), there is a liquid level detection module (liquid level detection device unit) in which a liquid level detector (liquid level detection device) is fixed to the container by a fixing member.

In the liquid level detection module, the liquid level detector is integrally fixed to a tip end portion of the fixing member, such as a bracket plate held by a lid body. The liquid level detector is inserted into the container through an opening formed in the container and thus assembled to the container (see, for example, Patent Literature 1).

In the liquid level detector, a detection element (such as a Hall IC) configured to detect a rotation angle of a magnet holder is accommodated in a support shaft of a housing. The detection element is electrically connected to a measurement unit outside the container via a lead wire (detection wire) which is electrically connected to an exposed part of a terminal exposed from the housing.

In the liquid level detection module, the housing is clamped by a clamp portion and a bracket body portion of the bracket plate formed of a metal material in a plate shape which has a longitudinal direction, so as to hold the liquid level detector by the bracket plate. Therefore, the housing of the liquid level detector and the bracket body portion of the bracket plate are attached in close proximity.

[Patent Literature 1] JP-A-2013-78141

The liquid level detector is used in the liquid stored in the container, when quantity of the liquid is reduced, the liquid level detector is exposed to the atmosphere. In the exposed state, moisture condensed in the container and liquid containing moisture are likely to stay between the housing and the bracket body portion, which are m close proximity, due to surface tension. Therefore, the staying moisture adheres to a connection portion between the terminal exposed from the housing and the lead wire.

In the exposed state in the atmosphere, when the condensed moisture adheres to the portion between the metal bracket plate and the liquid level detector, electric current flows between the terminal of the liquid level detector and the bracket plate due to conductivity of the moisture. As a result, electric corrosion caused by potential difference between materials of the terminal and the bracket plate, or electric corrosion caused by leakage of an operating current, may aggravate electric corrosion of the connection portion between the terminal and the lead wire.

SUMMARY

One or more embodiments provide a liquid level detection device unit preventing from electric corrosion at a connection portion between a terminal and a detection wire in the liquid level detection device attached to a fixing member.

In an aspect (1), a liquid level detection device unit includes a liquid level detection device configured to detect a liquid level of liquid stored in a tank, and a fixing member fixing the liquid level detection device to inside of the tank. The liquid level detection device includes a device body, at least one terminal electrically connected to a detection unit in a housing of the device body, and a detection wire in which one end is electrically connected to an exposed part of the terminal exposed from the housing. At least one through opening is provided on an attachment surface of the fixing member so as to face the exposed part of the terminal and prevent the liquid from staying in a connection portion between the terminal and the detection wire.

According to the aspect (1), the through opening facing the exposed part of the terminal exposed from the housing is provided on the attachment surface of the fixing member to which the liquid level detection device is attached. Therefore, a predetermined space in which moisture is Unlikely to accumulate due to surface tension is defined in the vicinity of the connection portion between the terminal and the detection wire, which is exposed from the housing attached in close proximity to the attachment surface of the fixing member.

Therefore, the moisture condensed in the container and the liquid containing moisture are less likely to stay between the attachment surface of the fixing member and the connection portion between the terminal and the detection wire, which are in close proximity. As a result, electric corrosion of the connection portion between the terminal and the detection wire is not aggravated by electric corrosion caused by potential difference between materials of the terminal and the fixing member, or electric corrosion caused by leakage of a current during operation of the liquid level detection device.

In an aspect (2), the at least one terminal may comprise a plurality of terminals. The at least one through opening may comprise a plurality of through openings. The plurality of through openings may be provided on the attachment surface of the fixing member so as to face the exposed parts of the plurality of terminals respectively.

According to the aspect (2), the plurality of through openings are provided on the attachment surface of the fixing member so as to face the exposed pans of the plurality of terminals respectively. Therefore, a reduction in strength of the fixing member can be prevented, as compared with a case where one through opening is provided on the attachment surface of the fixing member to face the exposed parts of the plurality of terminals.

In an aspect (3), a groove extending in a vertical direction in the tank may be provided on the attachment surface of the fixing member including at least one of the plurality of through openings.

According to the aspect (3), the groove extending in the vertical direction in the tank is provided on the attachment surface of the fixing member including the through opening. Therefore, water droplets adhering to the attachment surface of the fixing member in the vicinity of the through opening are quickly discharged downward along the groove extending in the vertical direction and are prevented from staying in the vicinity of the through opening.

According to the present invention, the liquid level detection device unit preventing from electric corrosion at the connection portion between the terminal and the detection wire in the liquid level detection device attached to the fixing member.

The present invention has been briefly described above. Details of the present invention are further clarified by reading a mode for carrying out the Invention described below with reference to the accompanying drawings.

DETAILED DESCRIPTION

Hereinafter, an embodiment according to the present invention will be described with reference to the drawings.

Figure 1:
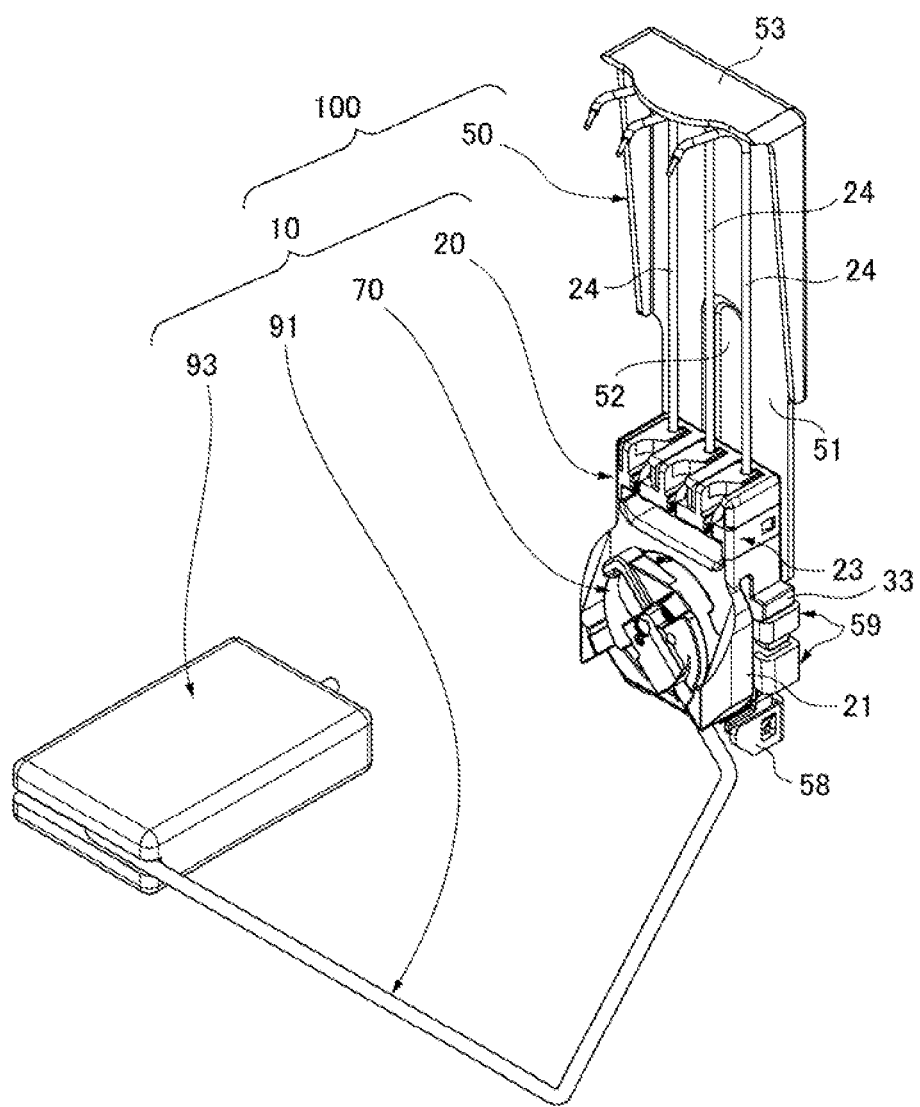
FIG. 1 is an overall perspective view of a liquid level detection device unit.
Figure 2:
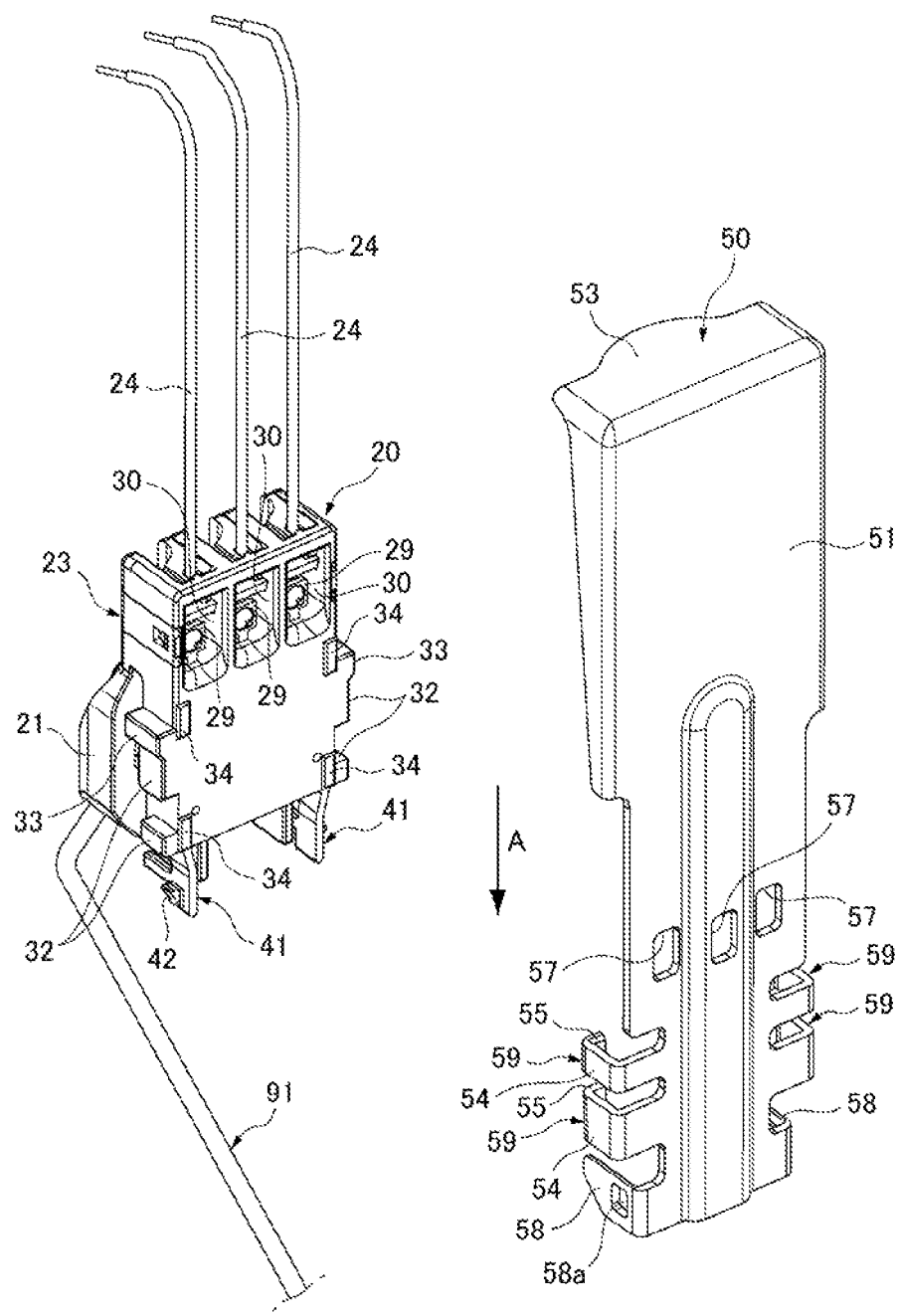
FIG. 2 is a rear perspective view of a state in which a liquid level detection device shown in FIG. 1 is detached from a fixing member.
Figure 3:
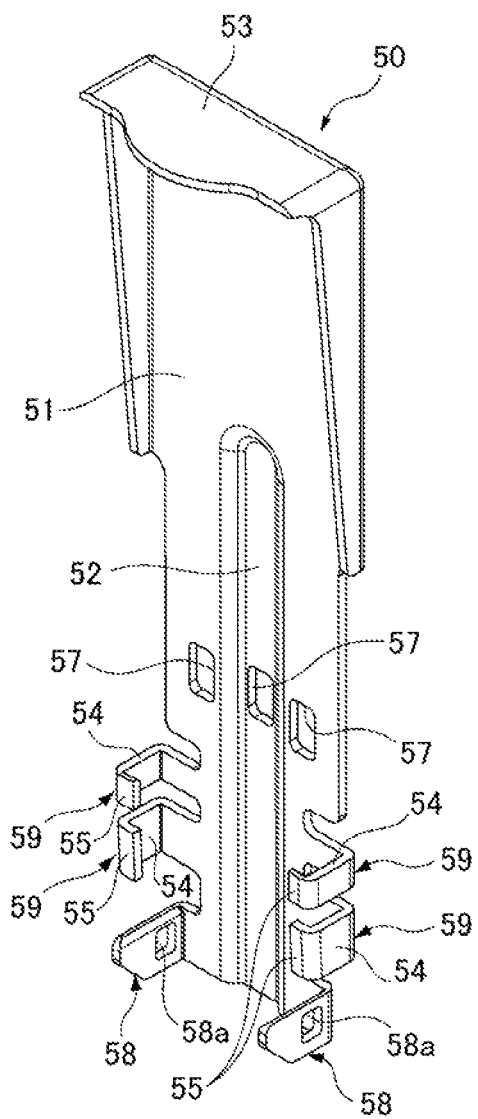
FIG. 3 is an overall perspective view of the fixing member shown in FIG. 1.
Figure 4:
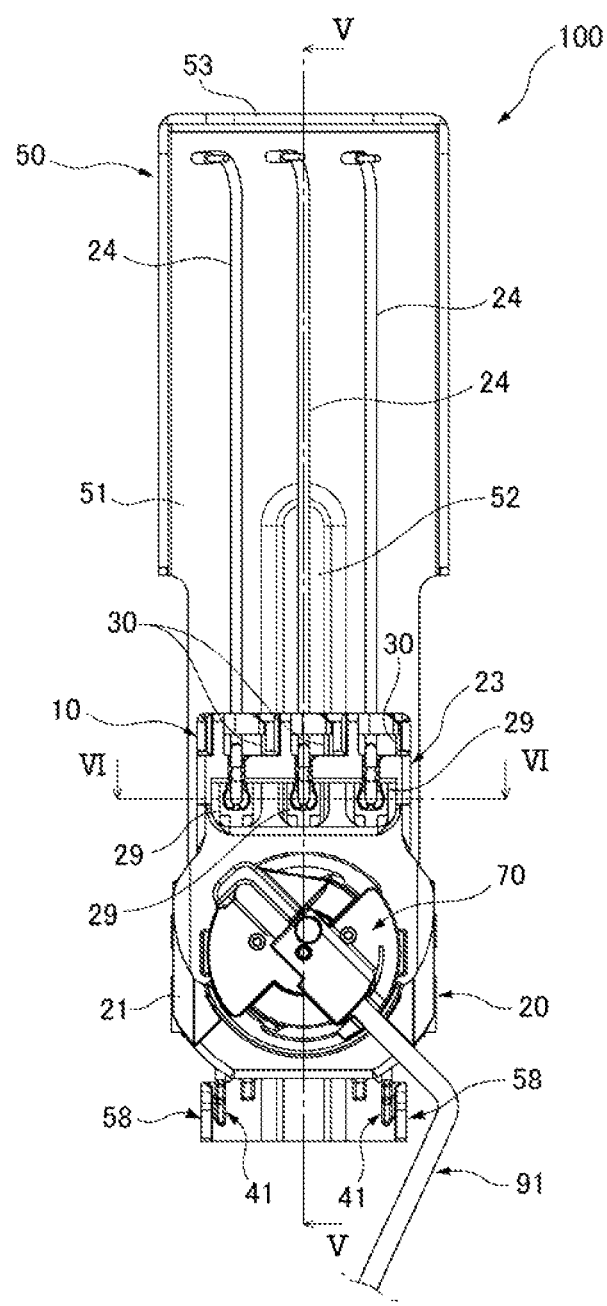
FIG. 4 is a front view of a main part of the liquid level detection device unit shown in FIG. 1.
Figure 5:
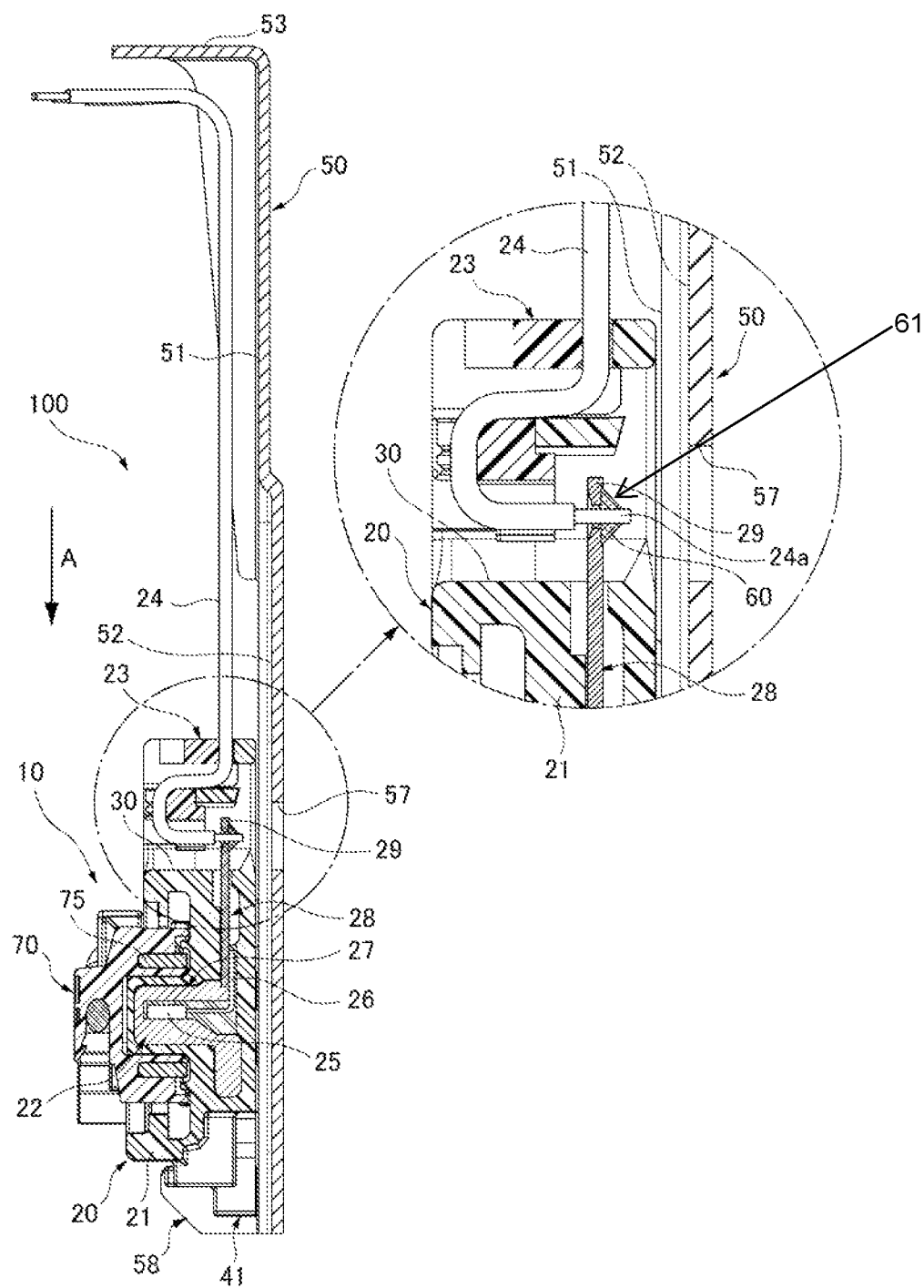
FIG. 5 is a cross-sectional view taken along line V-V of FIG. 4 and an enlarged cross-sectional view of a main part.
Figure 6:
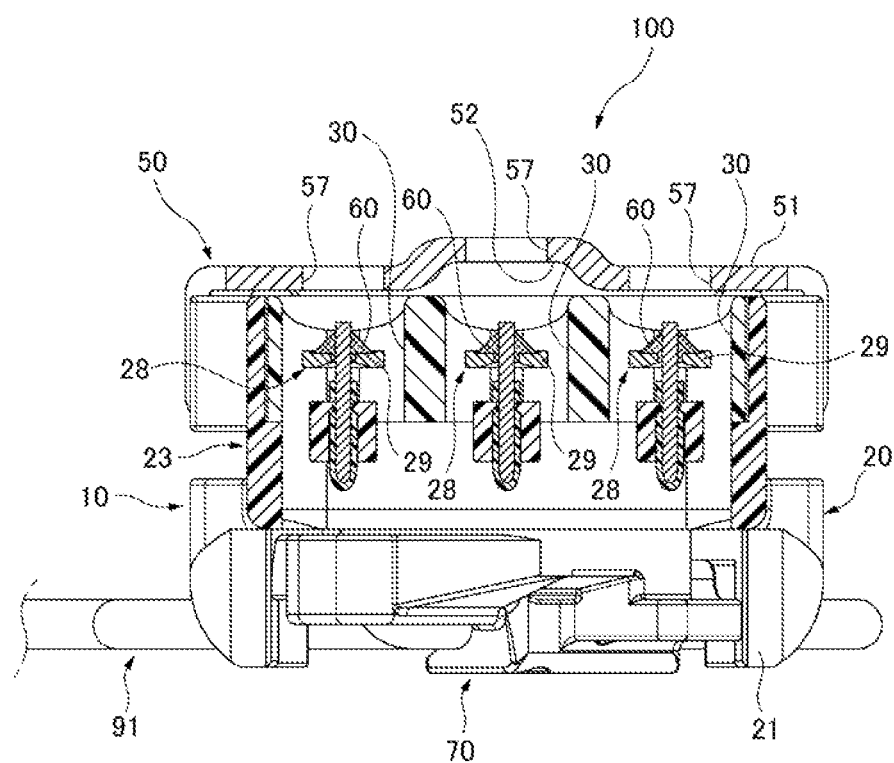
FIG. 6 is a cross-sectional view taken along line VI-VI of FIG. 4.

FIG. 1 is an overall perspective view of a liquid level detection device unit 100 according to an embodiment of the present invention, FIG. 2 is a rear perspective view of a state in which a liquid level detection device 10 shown in FIG. 1 is detached from a fixing member 50. FIG. 3 is an overall perspective view of the fixing member 50 shown in FIG. 1. FIG. 4 is a front view of a main part of the liquid level detection device unit 100 shown in FIG. 1. FIGS. 5 and 6 are cross-sectional views taken along lines V-V and VI-VI of FIG. 4.

As shown in FIGS. 1 and 2, the liquid level detection device unit 100 according to the present embodiment includes the liquid level detection device 10 and the fixing member 50 configured to fix the liquid level detection device 10 to a fuel tank (container).

The liquid level detection device unit 100 is inserted into the fuel tank through an opening provided in a ceiling portion of a fuel tank placed on a vehicle, such as an automobile. The liquid level detection device 10, which is attached to a tip end portion of the fixing member 50, detects a liquid level of fuel (liquid) stored in the fuel tank.

The liquid level detection device 10 according to the present embodiment includes a device body 20, a magnet holder 70, a float arm 91, and a float 93. The device body 20 includes a sensor housing (housing) 21, a sensor unit 22, and a holding member 23 (see FIG. 5).

As shown in FIGS. 4 to 6, the sensor unit 22 and the holding member 23 are assembled to the sensor housing 21. In the sensor unit 22, a Hall IC (detection unit) 27, which includes a Hall element 25, and three terminals 28, to which a lead 26 of the Hall IC 27 is electrically connected, are molded and integrated by an insulating mold member. One end of detection wires 24 held by the holding member 23 is electrically connected to exposed parts 29 of each terminal 28 exposed from the sensor housing 21, and these detection wires 24 are led out from an upper portion of the sensor housing 21.

The one end of each detection wire 24 is electrically connected to the exposed part 29 by inserting a core wire 24a into a hole formed in the exposed part 29 of the terminal 28 and then soldering with a solder 60. Therefore, the exposed part 29 of each terminal 28 is disposed inside an opening 30 penetrating the sensor housing 21 in a front-rear direction (a left-right direction in FIG. 5), and is exposed in the front-rear direction of the sensor housing 21 so that soldering can be performed.

One end of the float arm 91 is connected to the magnet holder 70. The other end of the float arm 91 is a free end, and the float 93 is fixed to the free end. The magnet holder 70 is formed in a cylindrical shape which includes an annular magnet 75 therein. The magnet holder 70 is mounted on a from surface side (left side in FIG. 5) of the sensor housing 21 and is rotatably held.

In the liquid level detection device 10, the float arm 91 swings in accordance with movement of the float 93 which follows the liquid surface, and the magnet holder 70 to which the float arm 91 is connected is rotated with respect to the device body 20. Then, the Hall IC 27 provided in the sensor housing 21 of the device body 20 detects a change in a magnetic flux of the magnet 75 of the magnet holder 70, and a detection result thereof is transmitted to a measurement unit (not shown via the detection wires 24. The measurement unit measures a liquid level based on the detection result from the Hall IC 27, and issues a warning if necessary. For example, the measurement unit issues a warning such as fuel shortage in the fuel tank.

The fixing member 50 shown in FIGS. 2 and 3 is formed of a strip-shaped (elongated rectangular) metal plate or the like. An upper end fixing portion 53 of a body portion 51 extending in a longitudinal direction is held by a lid body (not shown) which closes an opening of the fuel tank. The device body 20 of the liquid level detection device 10 is mounted to the body portion 51 of the fixing member 50 from above.

The body portion 51 of the fixing member 50 includes locking protrusions 58 and guide portions 59 protruding forward from two short direction side portions of the body portion 51, respectively. Two pairs of guide portions 59 are disposed at positions facing each other in a left-right direction with intervals therebetween. The guide portions 59 include plate-shaped wall portions 54 disposed in parallel to each other, and locking piece portions 55 protruding from edge portions of the wall portions 54 in a direction approaching each other.

The device body 20 of the liquid level detection device 10 is mounted by being slid in an insertion direction A (downward direction in FIG. 5) extending downward from an upper side to a lower side between the facing-each-other guide portions 59. The locking protrusions 58 are formed on a front side of the insertion direction A at positions below the respective guide portions 59, and are arranged at intervals. A locking hole 58a is formed in each locking protrusion 58. When the fixing member 50 to which the liquid level detection device 10 is mounted is inserted into the opening of the fuel tank, the locking protrusion 58 can contact a peripheral edge portion of the opening prior to the liquid level detection device 10, thus the liquid level detection device 10 can be protected.

An attachment surface of the body portion 51 of the fixing member 50 to which the liquid level detection device 10 is attached (a surface facing a rear surface of the mounted sensor housing 21) is provided with a through opening 57 which faces the exposed part 29 of the terminal 28 exposed to the opening 30 of the sensor housing 21.

According to the present embodiment, three through openings 57 are provided side by side in the short direction of the body portion 51 so as to face the exposed parts 29 of three terminals 28, respectively.

Although the through opening 57 of the present embodiment is formed in a substantially rectangular shape corresponding to the opening shape of the opening 30, the shape of the through opening 57 is not limited thereto. It is needless to say that the through-opening of the present invention can be formed in various shapes, such as a circle, an ellipse, and a polygon, as long as the opening shape thereof is capable of partitioning and forming, a predetermined space in which moisture is unlikely to accumulate due to surface tension in the vicinity of a connection portion between the terminal 28 and the detection wire 24, so as to prevent liquid from staying at the connection portion between the terminal 28 and the detection wire 24, There ma be only one through opening of the present invention provided to face the exposed parts 29 of the plurality of terminals 28.

Further, a groove 52 extending in a vertical direction in the fuel tank is provided on the attachment surface of the body portion 51 of the fixing member 50. The groove 52 is provided along the longitudinal direction of the body portion 51 so as to include the middle through opening 57 among the three through openings 57 arranged in the short direction. The groove 52 extends from a longitudinal direction middle portion to a lower end portion of the body portion 51. Accordingly, a long space extending in the vertical direction in the fuel tank is defined between the rear surface of the sensor housing 21 and the attachment surface of the body portion 51 in the device body 20 which is mounted to the fixing member 50.

As shown in FIG. 2, the device body 20 includes slide protrusions 32 on two side portions of the sensor housing 21. The slide protrusion 32 has a thickness slightly smaller than a gap between the body portion 51 and the locking piece portion 55 of the guide portion 59. A dimension between end surfaces of the slide protrusions 32 is slightly smaller than an interval between inner surfaces of the wall portions 54 of the guide portion 59. In the sensor housing 21, a stopper portion 33 which is larger than an outer shape of a cross-section of the slide protrusion 32 is formed at an end portion of the slide protrusion 32 on a rear side of the insertion direction A. The device body 20 includes a plurality of abutting surface portions 34 protruding slightly on the rear surface of the sensor housing 21.

Further, a pair of hooks 41 is formed in a lower portion of the sensor housing 21 on the front side in the insertion direction A between the guide portions 59. The hooks 41 extend downward at intervals from each other. Claw portions 42 which protrude outward are formed at tip ends of the hooks 41. An interval between tip ends of the claw portions 42 of the hooks 41 is larger than the interval between the locking protrusions 58 of the fixing member 50.

As for mourning the device body 20 of the liquid level detection device 10 to the fixing member 50, the hooks 41 are directed downward and the device body 20 is brought close to the fixing member 50 from above with a back surface of the device body 20 facing the side of the body portion 51 of the fixing member 50. Then, the device body 20 is inserted between the guide portions 59 with the back surface thereof being along the attachment surface of the body portion 51, and the slide protrusions 32 on the two side portions of the sensor housing 21 are inserted between the body portion 51 and the locking piece portion 55 of the guide portion 59.

Thereafter, the device body 20 is further pushed down, in this way, the claw portions 42 of the hooks 41 contact the locking protrusions 58 of the fixing member 50, and the hooks 41 are elastically deformed inward in a width direction of the sensor housing 21. When the device body 20 is pushed down until the stopper portions 33 located at upper ends of the slide protrusions 32 abut against the guide portions 59, the hooks 41, which are elastically deformed due to engagement between the claw portions 42 of the hooks 41 and the locking holes 58a of the locking protrusions 58, are restored toward the outside in the width direction of the sensor housing 21, and the claw portions 42 are locked in the locking holes 58a of the locking protrusions 58.

Accordingly, the slide protrusions 32 on the two side portions of the sensor housing 21 are locked by the guide portions 59 of the fixing member 50, the hooks 41 of the sensor housing 21 are locked to the locking protrusions 58 and prevented from coming off, and the device body 20 is securely mounted to the fixing member 50. In a state where the sensor housing 21 is mounted to the fixing member 50, the plurality of abutting surface portions 34 on the rear surface are abutted against the body portion 51. Accordingly, the device body 20 is fixed to the fixing member 50 in a stable state without rattling.

As described above, according to the liquid level detection device unit 100 according to the present embodiment, the through openings 57 facing the exposed parts 29 of the terminals 28 exposed from the sensor housing 21 are provided on the attachment surface of the body portion 51 of the fixing member 50 to which the liquid level detection device 10 is attached. Therefore, the predetermined space in which moisture is unlikely to accumulate due to surface tension is defined in the vicinity of the connection portion between the terminal 28 and the detection wire 24, which is exposed from the sensor housing 21 attached in close proximity to the attachment surface of the body portion 51 of the fixing member 50, as shown in FIGS. 5 and 6.

Therefore, moisture condensed in the fuel tank and fuel containing moisture are less likely to stay between the attachment surface of the body portion 51 of the fixing member 50 and the connection portion between the terminal 28 and the detection wire 24, which are in close proximity. As a result, electric corrosion of the connection portion 61 between the terminal 28 and the detection wire 24 is not aggravated by electric corrosion caused by potential difference between materials of the terminal 28 and the fixing member 50, or electric corrosion caused by leakage of a current during operation of the liquid level detection device 10.

Figure 7:
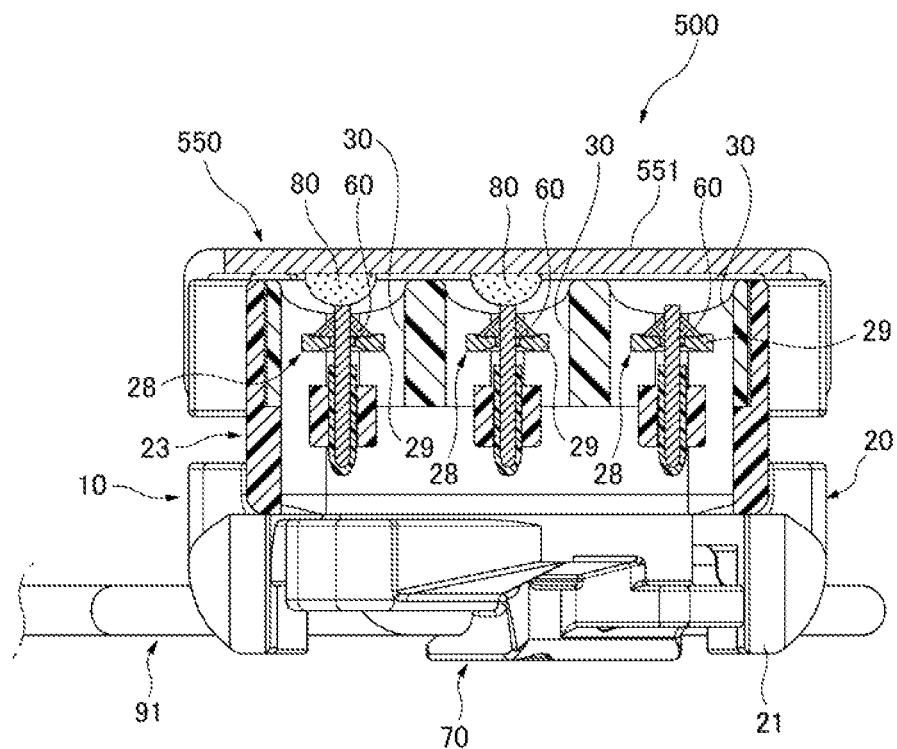
FIG. 7 is a cross-sectional view of a liquid level detection device unit according to a reference example, which is a cross-sectional view corresponding to cross-section VI-VI of FIG. 4.

FIG. 7 is a cross-sectional view of a liquid level detection device unit 500 according to a reference example, which is a cross-sectional view corresponding to cross-section VI-VI of FIG. 4.

The liquid level detection device unit 500 shown in FIG. 7 includes the liquid level detection device 10 and a fixing member 550 configured to fix the liquid level detection device 10 to the fuel tank.

An attachment surface of a body portion 551 of the fixing member 550 is not provided with the through openings 57 as in the body portion 51 of the fixing member 50 according to the above-described embodiment. For this reason, as shown in FIG. 7, a water droplet 80 is likely to stay, due to surface tension, on the attachment surface of the body portion 551 which is in close proximity to the rear surface of the sensor housing 21. Then the staying water droplet 80 adheres to the connection portion between the terminal 28 and the detection wire 24, which is exposed from the sensor housing 21. A current flows between the terminal 28 and the fixing member 550 due to conductivity of moisture when the water droplet 80 adheres between the fixing member 550 and the terminal 28 of the liquid level detection device 10 as described above. As a result, in the liquid level detection device unit 500 according to the reference example, electrical corrosion may occur in the connection portion between the terminal 28 and the detection wire 24 in the liquid level detection device 10.

In the liquid level detection device unit 100 according to the present embodiment, the plurality of (three in the embodiment) through openings 57 are provided on the attachment surface of the body portion 51 of the fixing member 50 so as to face exposed parts 29 of the plurality of (three in the embodiment) terminals 28 respectively. Therefore, a reduction in strength of the fixing member 50 can be prevented, as compared with a case where one through opening is provided on the attachment surface of the body portion 51 of the fixing member 50 to face the exposed parts 29 of the plurality of terminals 28.

Further, in the liquid level detection device unit 100 according to the present embodiment, the groove 52 extending in the vertical direction in the fuel tank is provided on the attachment surface of the body portion 51 including at least one through opening 57. Therefore, water droplets adhering to the attachment surface of the body portion 51 in the vicinity of the through opening 57 are quickly discharged downward along the groove 52 extending in the vertical direction and are prevented from staying in the vicinity of the through opening 57.

As described above, according to the liquid level detection device unit 100 according to the present embodiment, electric corrosion can be prevented from occurring at the connection portion between the terminal 28 and the detection wire 24 in the liquid level detection device 10 which is attached to the fixing member 50.

The present invention is not limited to the above embodiment, and modifications, improvements, and the like can be made as appropriate. In addition, the material, shape, size, number, arrangement position, and the like of each component in the above-described embodiment are optional and are not limited as long as the present invention can be achieved.

For example, although in the liquid level detection device 10 which is mounted to the fixing member 50, the float arm 91 swings in accordance with the movement of the float 93 which follows the liquid surface, and the magnet holder 70 to which the float arm 91 is connected is rotated with respect to the device body 20, then the Hall IC 27 provided in the sensor housing 21 of the device body 20 detects a change in the magnetic flux of the magnet 75 of the magnet holder 70, the liquid level detection device is not limited to such a type, and various types of liquid level detection devices can be used.

Features of the embodiment of the liquid level detection device unit according to the present invention described above will be briefly summarized in the following [1] to [3].

[1] A liquid level detection device unit (100) comprising:
a liquid level detection device (10) configured to detect a liquid level of liquid stored in a tank;
a fixing member (50) fixing the liquid level detection device to inside of the tank; and
wherein the liquid level detection device includes a device body (20), at least one terminals (28) electrically connected to a detection unit (Hall IC 27) in a housing (sensor housing 21) of the device body, and a detection wire (24) in which one end is electrically connected to an exposed part (29) of the terminal exposed from the housing, and
wherein at least one through opening (57) is provided on an attachment surface of the fixing member so as to face the exposed part of the terminal and prevent the liquid from staying in a connection portion between the terminal and the detection wire.

[2] The liquid level detection device unit (100) according to [1],
wherein the at least one terminal (28) comprises a plurality of terminals (28),
wherein the at least one through opening (57) comprises a plurality of through openings (57), and
wherein the plurality of through openings (57) is provided on the attachment surface of the fixing member (50) so as to face the exposed pans (29) of the plurality of terminals (28) respectively.

[3] The liquid level detection device unit (100) according to [2],
wherein a groove (52) extending in a vertical direction in the tank is provided on the attachment surface of the fixing member (50) including at least ne of the plurality of through openings (57).

DESCRIPTION OF REFERENCE NUMERALS AND SIGNS

10: Liquid level detection device
20: Device body
21: Sensor housing (housing)
24: Detection wire
27: Hall IC (detection unit)
28; Terminal
29: Connection unit
50: Fixing member
51: Body portion
52: Groove
57: Through opening
100; Liquid level detection device unit

What is claimed is:

1. A liquid level detection device unit comprising:
a liquid level detection device configured to detect a liquid level of liquid stored in a tank; and
a fixing member fixing the liquid level detection device to inside of the tank;
wherein the liquid level detection device includes a device body, at least one terminal electrically connected to a detector in a housing of the device body, and a detection wire in which one end is electrically connected to an exposed part of the terminal exposed from the housing, and
wherein at least one through opening is provided on an attachment surface of the fixing member so as to directly face the exposed part of the terminal and prevent the liquid from staying in a connection portion between the terminal and the detection wire.

2. The liquid level detection device unit according to claim 1,
wherein a hole is formed in the exposed part of the terminal, the hole penetrating the terminal in a direction in which the exposed part of the terminal and the at least one through opening oppose each other, and
wherein the one end of the detection wire is electrically connected to the exposed part of the terminal in a state in which the detection wire is inserted into the hole from a side opposite to the at least one through opening and protrudes toward the at least one through opening.

3. The liquid level detection device unit according to claim 1,
wherein the attachment surface of the fixing member has an elongated rectangular shape extending in a vertical direction,
wherein a groove extending in the vertical direction is provided on the attachment surface, the groove extending from a middle portion to a lower end portion of the fixing member along a longitudinal direction of the fixing member, and
wherein the at least one through opening is formed in a bottom surface of the groove.

4. The liquid level detection device unit according to claim 1,
wherein the at least one terminal comprises a plurality of terminals,
wherein the at least one through opening comprises a plurality of through openings, and
wherein the plurality of through openings is provided on the attachment surface of the fixing member so as to face the exposed parts of the plurality of terminals respectively.

5. The liquid level detection device unit according to claim 4,
wherein a groove extending in a vertical direction in the tank is provided on the attachment surface of the fixing member including at least one of the plurality of through openings.

* * * * *